US 9,483,804 B2

(12) United States Patent
Losch et al.

(10) Patent No.: US 9,483,804 B2
(45) Date of Patent: Nov. 1, 2016

(54) SERVER SYSTEM FOR ADMINISTRATION OF SEQUENCES FOR AGRICULTURAL WORKING MACHINES

(71) Applicant: CLAAS SELBSTFAHRENDE ERNTEMASCHINEN GMBH, Harsewinkel (DE)

(72) Inventors: Michael Losch, Versmold (DE); Markus Grevinga, Saerbeck (DE); Georg Eggenhaus, Saerbeck (DE); Victor Klueber, Rheda-Wiedenbrueck (DE); Eckehard Jeppe, Zierenberg (DE); Volker Brill, Schloss Holte (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 183 days.

(21) Appl. No.: 14/274,937

(22) Filed: May 12, 2014

(65) Prior Publication Data

US 2014/0343803 A1  Nov. 20, 2014

(30) Foreign Application Priority Data

May 16, 2013 (DE) .................. 10 2013 008 339

(51) Int. Cl.
*G05D 1/02* (2006.01)
*G06Q 50/02* (2012.01)
*G06Q 10/06* (2012.01)

(52) U.S. Cl.
CPC ............ *G06Q 50/02* (2013.01); *G05D 1/0276* (2013.01); *G06Q 10/06* (2013.01)

(58) Field of Classification Search
CPC ..... G06Q 50/02; G06Q 10/06; G05D 1/0276
USPC ........................................................ 701/50
See application file for complete search history.

(56) References Cited

U.S. PATENT DOCUMENTS

| | | | |
|---|---|---|---|
| 6,990,399 B2 | 1/2006 | Hrazdera et al. | |
| 7,854,108 B2 * | 12/2010 | Koselka | A01D 46/30 56/10.2 A |
| 8,260,507 B2 * | 9/2012 | Schumann | A01C 21/00 382/110 |
| 8,275,522 B1 * | 9/2012 | Groeneweg | G06Q 10/06 701/50 |
| 8,463,510 B2 * | 6/2013 | Knapp | A01B 79/005 701/50 |
| 8,594,897 B2 * | 11/2013 | Motavalli | G06Q 10/0631 111/200 |
| 8,849,523 B1 * | 9/2014 | Chan | A01B 79/005 111/149 |
| 8,935,059 B2 * | 1/2015 | Blank | A01B 79/005 701/30.3 |
| 8,983,738 B2 * | 3/2015 | Avitzur | 701/23 |

FOREIGN PATENT DOCUMENTS

DE        102 50 694        2/2004

* cited by examiner

*Primary Examiner* — Richard Camby
(74) *Attorney, Agent, or Firm* — Michael J. Striker

(57) ABSTRACT

A server system for the administration of sequences for agricultural working machines made up of parameterized process steps of working devices includes a server and database in which a sequence inventory of sequences is stored. Sequence identifiers are assigned to each of the sequences of the sequence inventory, which describe one or more process steps of the respective sequence. A network interface to a global communication network is included to receive connection requests from a client and establish a connection-oriented, bidirectional data channel between the server and the client. The server receives a selection criterion from the client via the data channel, determines a sequence from the sequence inventory on the basis of a comparison of the criterion with the sequence identifiers and transmits the determined sequence to the client via the data channel.

15 Claims, 5 Drawing Sheets

SERVER SYSTEM FOR ADMINISTRATION OF SEQUENCES FOR AGRICULTURAL WORKING MACHINES

CROSS-REFERENCE TO A RELATED APPLICATION

The invention described and claimed hereinbelow is also described in German Priority Document DE 10 2013 008339.7, filed on May 16, 2013. The German Priority Document, the subject matter of which is incorporated herein by reference, provides the basis for a claim of priority of invention under 35 U.S.C. 119(a)-(d).

BACKGROUND OF THE INVENTION

The invention relates to a server system for the administration of sequences for agricultural working machines and to a control device for processing sequences for agricultural working machines.

Agricultural working machines typically are utilized with a series of working devices. The working devices are either permanently installed or are coupled-on and are provided to perform various working steps, or are even used as working machines connected to one another in a train. It is also known to permit the control of the agricultural working machine and the working devices to be performed by a control device disposed thereon, such as an electronic control unit.

The agricultural working machine often works through a field of crop and, once the boundary of the field of crop is reached, enters the headland. In the headland, a certain sequence of control processes must be implemented on the working devices. The control sequences depend on the specific working devices installed on the agricultural working machine and on various basic conditions specific to the particular circumstances. This sequence of control processes is often the same for a certain combination of working devices installed on the agricultural working machine and for a predefined type of crop on the field and headland.

It is known from the prior art, such as DE 102 50 694, to design the electronic control unit such that a sequence of control processes that is repeatedly entered by the operator is automatically detected and is stored as a learned sequence of process steps of the agricultural working machine and the working devices thereof. A sequence of process steps learned in this manner can then be called up once more by the operator simply by pressing a button, or can even be automatically triggered depending on a certain position of the working machine in the field of crop or headland. It is furthermore known from the prior art also to further process and analyze such sequences outside of and remote from the control unit, for example, on a stationary computer of the particular agricultural operation, which can be referred to as a farm personal computer (PC). It is thereby made possible to utilize a nearly subliminal experience of the operator of the agricultural working machine in the manual input of control processes to generate a corresponding sequence of process steps having the correct parameters.

The disadvantage of this prior art is that this learning effect, in which the knowledge and skills of a human operator are electronically detected and further processed, is only available to a small circle of users. In the above-described constellation, a sequence of thusly generated process steps is used only on fields belonging to the same agricultural operation and can be shared only sporadically, and not systematically, with other users of an agricultural working machine having a similar control unit.

SUMMARY OF THE INVENTION

The present invention overcomes the shortcomings of known arts, such as those mentioned above.

To that end, the present invention provides a system for the administration of sequences for agricultural working machines, which enables substantially more comprehensive synergies to occur between various users and owners of agricultural working machines in similarly configured constellations.

"Agricultural working machines" and "working machines" are used interchangeably herein to mean agricultural vehicles and trains formed thereof having permanently installed or coupled-on working devices that are used in agriculture. This includes, in particular, combine harvesters, forage harvesters, and tractors having working devices attached thereto, or working devices pulled thereby.

In the following, "sequences" refers to sequences of process steps of the agricultural working machines and, in particular, the working devices, which are usually parameterized. Therefore, these are predefined sequences of control commands, in which certain instructions are coupled to a parameter setting for these special instructions. One example is starting up a blower to a certain percentage of maximum output.

The invention recognizes that a quasi-evolutionary optimization of several different sequences of this type, which are driven by the operators but are automatically delivered can be achieved in that these sequences are stored in a central server in a defined manner and, from there, are made available to operators of agricultural working machines worldside, who use or could use such sequences themselves. It is thereby possible to directly compare results of similar sequences, for example, having different parameters of the process steps, thereby clarifying which parameters or other settings offer particular advantages. It is also possible for an operator to learn of a finding that neither he nor any operator known to him has tried yet, but rather that originates from an operator who is entirely unknown to him and may be located geographically far away from him, but who works under similar basic conditions.

Combined with the possibility of learning a sequence on the basis of process steps that are repeatedly entered in a manual manner, a global self-optimization of sequences and parameters of process steps associated therewith is possible with the instant invention. It is easy to understand that the resultant increases in productivity are potentially enormous, because the exchange of knowledge is made transparent to the greatest extent possible.

In an embodiment, it is possible to directly upload a sequence of such process steps, which has been generated by an operator, either manually or automatically, from a device assigned to the agricultural working machine to a server according to the invention.

In turn, sequences are linked to existing course inventories, i.e., data that have been measured or generated, which correspond to the result of a processing of the sequence. In this manner, a possible variability of the results and the degree of reproducibility of the result of a sequence also can be made transparent.

An operator is provided with a particularly wide choice of selections when he cannot only simply download a sequence made available by the server system, but when he can also display and compare a plurality of proposed sequences according to desired criteria.

The server is configured to automatically detect dependencies between results of a sequence and the parametrization thereof, or special environmental situations. It is thereby possible to create complex sequences, in which, for example, the provision of a special process step or the setting of parameters for this process step depend on the presence or absence of certain basic conditions. Therefore, a sequence need not be implemented either in entirety or not at all, but rather can provide such variable dependencies or parameterizations.

The server system can notify control devices on working machines, about which control devices it is known that these use a certain combination of working devices, for example, when well-suited sequences for this combination are added to a data base of the server.

BRIEF DESCRIPTION OF THE DRAWINGS

Further features and advantages of the invention will become apparent from the description of embodiments that follows, with reference to the attached figures, wherein.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
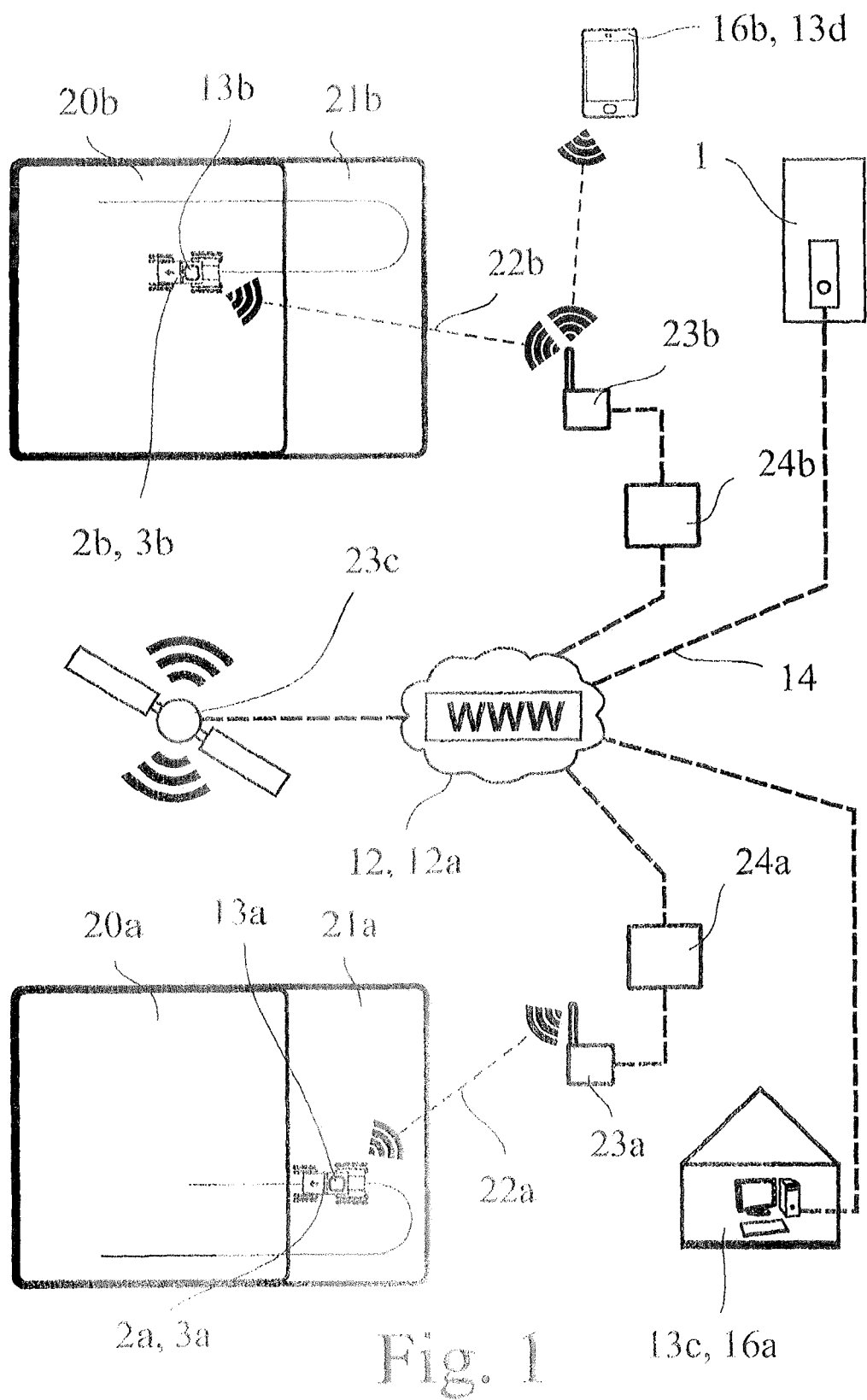
FIG. 1 presents an overview of a system for the administration of sequences for agricultural working machines that includes a server system and a corresponding control device according to the invention.

FIG. 1 presents an overview of a server system according to the invention. The FIG. 1 server system comprises a server 1 and two agricultural working machines 2a, b, which are intended to be forage harvesters 3a, b.

This server system is used for the administration of sequences 4a-d for agricultural working machines 2a,b, wherein the sequences 4a-d each comprise a series of parameterized process steps 5a-f of working devices 6a-f of an agricultural working machine 2a,b.

Figure 2:
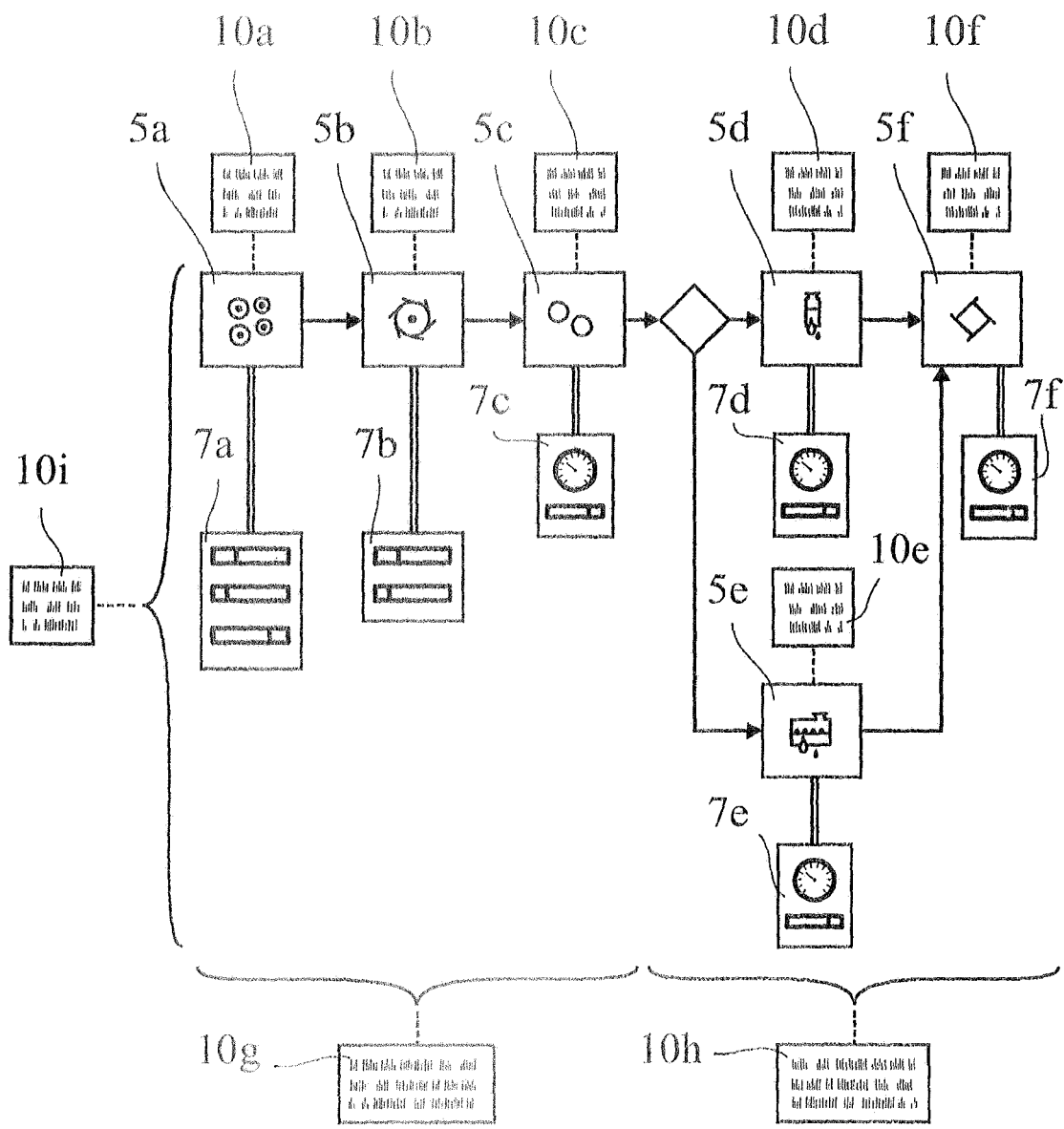
FIG. 2 presents a schematic representation of a sequence as a series of parameterized process steps of an agricultural working machine according to the invention.

FIG. 2 shows such a sequence 4a in greater detail. The sequence 4a comprises the process steps of intake 5a, chopping 5b, cracking 5c, combining 5d, e and discharging 5f. In the present example, this sequence 4a is implemented by a forage harvester 3a, b, which is intended merely as an example and is not intended to be limited thereto. The working devices 6a-f associated with the process steps are depicted schematically in FIG. 3.

One parameter set 7a-f is assigned to the process steps 5a-f, respectively, wherein the parameter set 7a-f describes the respective process step 5a-f. Possible meanings of a parameter of the parameter set 7a-f in this case are, for example, engine output, extension length, or, particularly for the process step 5b of chopping, length of cut. Parameters of a parameter set 7a-f in this sense also can be the duration of the execution of a process step 5a-f and the time until the respective next process step.

Figure 4:
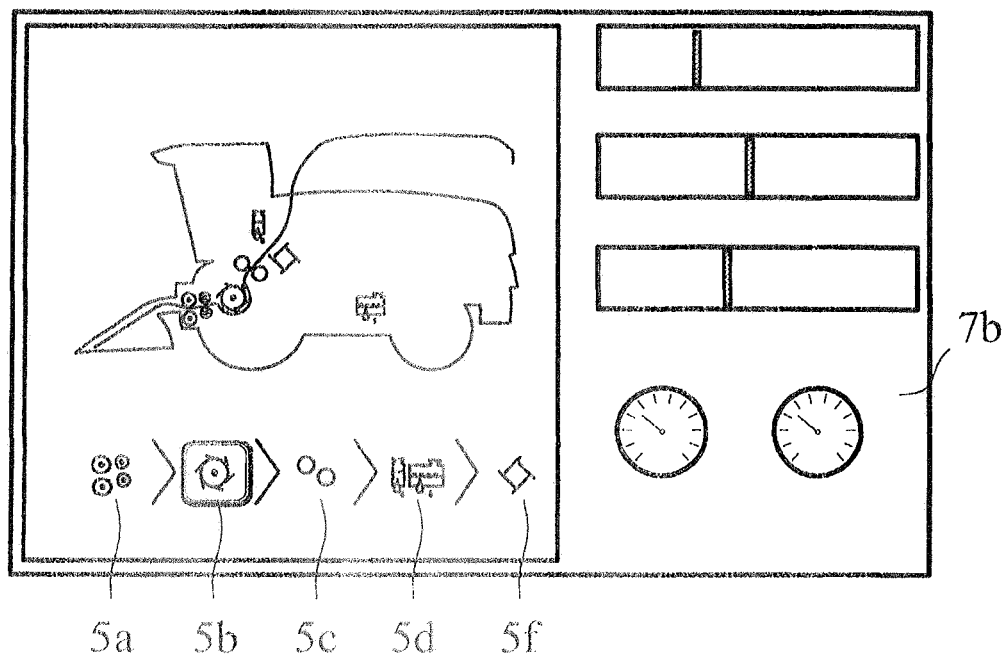
FIG. 4 presents a user interface of the control device on which a sequence and assigned parameters are displayed.

FIG. 4 shows a graphical representation of the parameter set 7b for the process step 5b of chopping 5b, as an example.

The server 1 of the server system according to the invention comprises a database 8, in which a sequence inventory 9 of sequences 4a-d is stored. The server 1 can be basically any computer system, which can also comprise various individual computers, having a database 8. Database 8 can be relational, object-oriented or of any other type of configuration and in which the sequences 4a-d are stored as a sequence inventory 9.

According to the invention, sequence identifiers 10a-i are assigned to each of the sequences 4a-d of the sequence inventory 9. The sequence identifiers 10a-i describe one or more process steps 5a-f of the respective sequence 4a-d.

Figure 3:
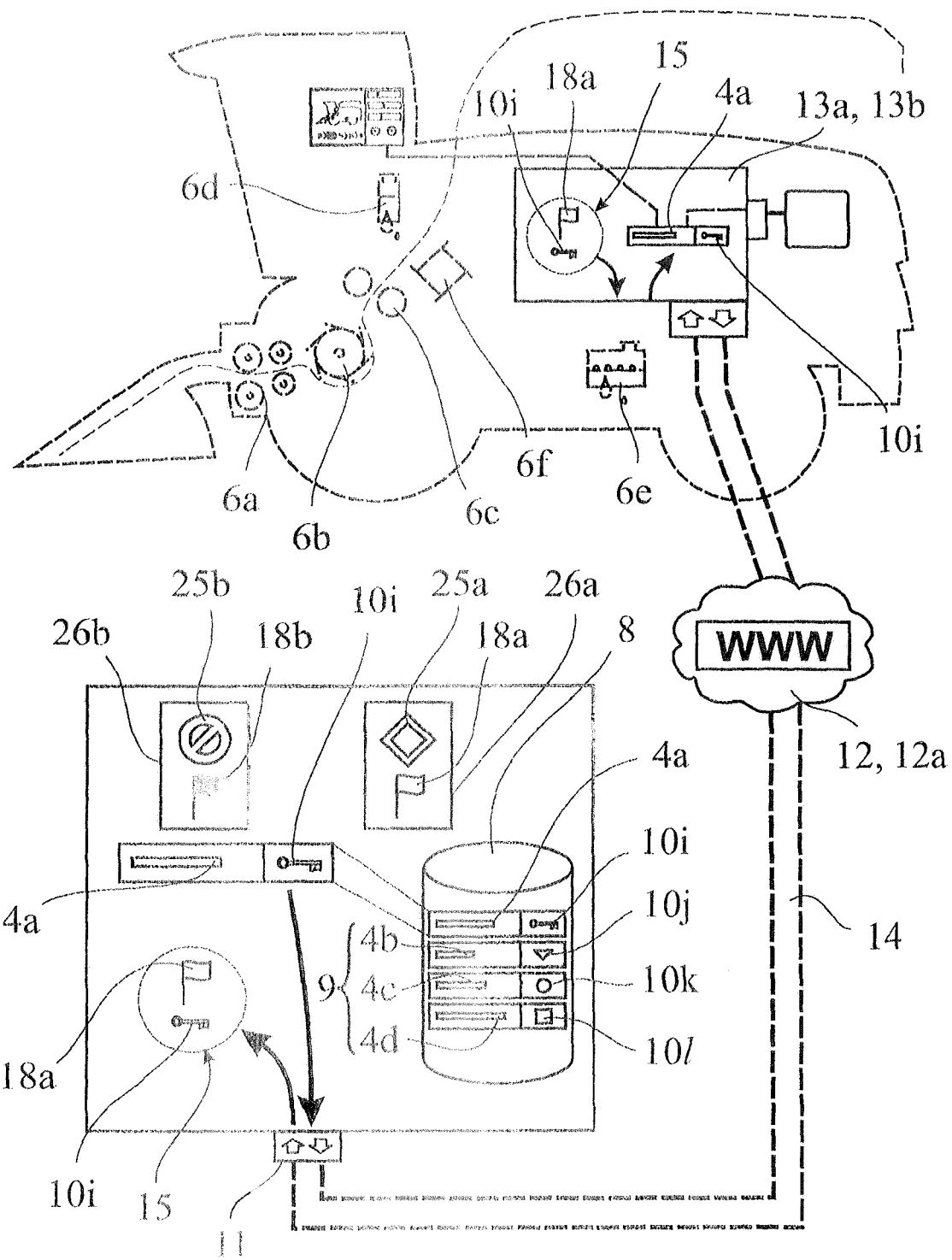
FIG. 3 presents a schematic representation of transmission of the sequence of FIG. 2 from a server system to a control device according to the invention.

FIG. 3 schematically depicts the server 1 comprising the data base 8 and the sequence inventory 9, wherein only one sequence identifier 10i-l (which is only symbolically characterized), is assigned to the sequences 4a-d in each case. The sequence identifiers 10i-l describe the sequences 4a-d in entirety and, therefore, each process step of the respective sequence 4a-d.

FIG. 2 shows, in particular, that the sequence identifiers 10a-i can relate not only to the entire sequence 4a-d, but also, only, to one or more process steps 5a-f of the respective sequence. It is clear, for example, that the sequence identifiers 10a-f each relate to only to the corresponding process step 5a-f and describe only this one. In the case of a sequence identifier 10a-f related to only one process step in particular, it is possible for such a sequence identifier 10a-f to comprise the corresponding parameter set 7a-f or to be composed only thereof.

The sequence identifier 10g, in turn, is assigned to the process steps 5a, b, c and the sequence identifier 10h is assigned to the process steps 5d, e, f and describes these. Finally, as shown in the representation in FIG. 3, the sequence identifier 10i is assigned to the entire sequence 4a and, therefore, all the process steps 5a-f thereof and, describes these. The sequence identifiers 10a-i can therefore describe one, several or all process steps 5a-f of the respective sequence 4a-d.

According to the invention, the server 1 furthermore comprises a network interface 11 to a global communication network 12. The network interface 11 is designed to receive connection inquiries from a client 13a-d and establish a connection-oriented, bidirectional data channel 14 between the server 1 and the client 13a-d. The network interface 11 can be, in particular, an interface implemented in a software package that enables access to an Ethernet network, for example. The global communication network 12 can be the Internet 12a, in particular. The concept of the client 13a-d should be broadly interpreted within the meaning of the invention, and relates to any entity formed in software and/or hardware that directs connection inquiries to the network interface 11 and by which a preferably connection-oriented, bidirectional data channel 14 can be established between the server 11 and the client.

A bidirectional data channel 14 refers, for example, to a connection in the sense of a "socket" (which is known from Internet technology) between the server 1 and the client 13a-d and, in particular, a connection according to HTTP (Hypertext Transfer Protocol) or FTP (File Transfer Protocol), both of which are connection-oriented by their protocol layer of the TCP (Transmission Control Protocol). A connection-oriented, bidirectional data channel 14 in the present sense can be communication between the client 13a-d and the server 1 that is based on UDP (User Datagram Protocol) and implements a connection at a higher protocol level, such as the application level.

The same inventive principle applies, for example, when two or more "sockets", in terms of a network, having the respective end points thereof disposed in the same device are used for communication and a few of these basically bidirectional sockets are used in only one direction. In this case, all such sockets, as a whole, form a bidirectional data channel 14 according to the invention. In this context, "connection-oriented" means that the state of an existing connection between the client 13a, b and the server 1 is established by software and is exited when the connection is disconnected, possibly upon expiration of a certain time period. FIGS. 1 and 3 show a connection-oriented, bidirectional data channel 14 in a schematic representation.

According to the invention, the server 1 is designed to receive a selection criterion 15 from the client 13a-d via the data channel 14. Moreover, according to the invention, the server 1 is designed to determine a sequence 4a from the sequence inventory 9 on the basis of a comparison of the selection criterion 15 with the sequence identifier 10a-i of the sequences 4a-d of the sequence inventory 9 and to transmit the determined sequence 4a to the client 13a-d via the data channel 14. This includes the case in which more than one sequence 4a-d is determined and transferred.

These circumstances are shown in FIG. 3, in which the selection criterion 15 is symbolically represented as a key. The selection criterion 15 is therefore received by the server 1 and, by a comparison with the sequence identifiers 10i-l in the sequence inventory 9, precisely that sequence 4a is determined that has the sequence identifier 10i corresponding to a key that is identical to the symbol of the selection criterion 15. The comparison procedure according to the invention is not limited to the determination of an identity, as described in this example, but rather can comprise any decision criterion that accounts for the selection criterion 15 and the sequence identifiers 10a-i. Simply stated, the client 13a-d therefore provides a selection criterion 15, on the basis of which the server 1 determines, from the sequence inventory 9 thereof, the sequence 4a having the corresponding sequence identifier 10i and transmits same to the client 13a-d via the data channel 14.

The client 13a-b can be an electronic control device, which also is referred to as a control device. In this case, the sequence 4a is implemented by the agricultural working machine 2a on which the control device is disposed. The client 13c also can be a stationary computer of an agricultural operation, a so-called farm personal computer 16a, in which the sequence 4a is not immediately implemented, but which is possibly only stored or processed. The client 13d also can be a mobile electronic device, which is described in greater detail further below.

Examples of sequence identifiers 10a-i will now be presented. The sequence identifiers 10a-i can comprise a functional property, which means, for example, a type of working device or a working-device identification. A type of working device would be the "blower" type, for example, wherein the working-device identification can indicate either the type of working device 6a-f in the sense of a model number or even a production serial number of the working device 6a-f. The sequence identifiers 10a-i also can comprise a parameter setting of a working device 6a-f, which can correspond to the parameter sets 7a-f of the process steps 5a-f, for example, as described above. Furthermore, the sequence identifiers 10a-i can comprise a sensor setting, which involves, for example, optical or moisture sensors on the agricultural working machine 2a, b, 3a, b. Furthermore, the sequence identifiers 10a-i can comprise a participant identifier 18a-c, wherein this participant identifier 18a-c can be a personal identification that identifies the person who is the operator, or a client identification, which identifies a special client 13a-d as the instance of a communication node in a network, independently of the particular person who is the operator.

A sequence identifier 10i according to the invention also could refer to an agricultural working machine 2a, b as a whole. Selectively, the working devices 6a-f of the agricultural working machine 2a, b are therefore also directly identified or the sequence identifier 10i can be assigned to further sequence identifiers 10a-e, each of which, per se, identifies a working device 6a-f of the agricultural working machine 2a, b. Such a sequence identifier 10i, which represents an agricultural working machine 2a, b, can be considered, in particular, to comprise a functional property. This is referred to in the following as a working-machine identifier.

In addition, the sequence identifiers 10a-i also can comprise a utilization-environment property, including, for example, the determination of the sequence 4a-d for use in a certain environment or with a certain basic condition. This could be a certain type of grain, for example, which is supposed to be processed or harvested with the sequence 4a-d.

The sequence identifiers 10a-i assigned to a sequence 4a-d also can comprise data basically related to a course. In this sense, the utilization-environment properties also could include values that were determined after or during the implementation of such a sequence 4a-d. This includes, in particular, sensor data, that is, measured values from sensors detected once, continuously, or periodically during the implementation of the sequence 4a-d, or a working result that indicates a harvested quantity, for example. This working result can be a result metric 17a-c, in particular, which provides a quantitative statement about the output achieved, for the purpose of making a comparison. Therefore, the sequence identifiers 10a-i that are assigned to a sequence 4a-d and that relate thereto and are therefore assigned thereto need not be limited to setpoint values, but rather can also comprise results values from one or more passes, as a component of the sequence identifiers 10a-i. The separation of these course data from the sequence identifiers 10a-i into a separate data structure, which also is possible, is described in greater detail further below as a further intended possibility.

In order to ensure that the largest possible sequence inventory 9 can be built from a variety of sources, it is preferably provided that the server 1 is designed to receive a user-generated frequency 4a-d, to which a sequence identifier 10a-i is assigned, from a client 13a-d via the data channel 14 and add this to the sequence inventory 9. The server 1 therefore not only transmits sequences 4a-d, as described above, to a client 13a-d, but also receives new sequences 4a-d therefrom. Given that the server 1 adds this to the sequence inventory 9 thereof, the respective sequence 4a-d is always automatically made available to other clients 13a-d as well. In this manner, a system-wide learning effect sets in, because the inventory of sequences 4a-d is systematically detected by the respective sequence identifier 10a-i.

As indicated above, in addition to the sequences 4a-d and the sequence identifiers 10a-i thereof, separate data records resulting from the implementation of the sequences 4a-d preferably also are retained. For example, a course inventory of agricultural course data is preferably stored in the database 8, which comprises a utilization-environment property and/or a working result, as described above.

A course identifier is preferably assigned to these course data in each case, wherein, furthermore, a sequence 4a-d of the sequence inventory 9 is preferably assigned to the course data in each case. Therefore, in particular, that sequence 4a-d is assigned, the implementation of which resulted in the course data. Furthermore, according to this preferred embodiment, the server 1 is designed to receive a course criterion, which preferably comprises a participant identifier 18a-c in the above-described sense, from the client 13a-d via the data channel 14, determines course data from the course inventory on the basis of a comparison of the course criterion with the course identifiers of the course inventory and to transmit the determined course data to the client 13a-d via the data channel 14.

This represents access by the client 13a-d to the course inventory in the server 1 that functions analogously to the access to the sequences 4a-d with the aid of a sequence identifier 10a-i. The only difference is that a course identifier instead of the sequence identifier 10a-i is provided in this case. In the case of a certain sequence 4a-d, it is thereby made possible for the client 13a-d to also provide the results values determined for this sequence 4a-d, provided these are not already stored in the sequence or in a sequence identifier 10a-i assigned to the sequence.

The determination of a sequence 4a-d from the sequence inventory 9 on the basis of a comparison of the selection criterion 15 with the sequence identifiers 10a-i of the sequences 4a-d of the sequence inventory 9 is easily implemented, in particular, when the selection criterion 15 comprises a sequence identifier 10a-i. Preferred embodiments of this sequence identifier 10a-i included in the selection criterion correspond to the sequence identifier 10a-i.

When the selection criterion 15 is an above-described working-machine identifier, i.e., a sequence identifier 10i, which refers to an agricultural working machine 2a, b as a whole, the comparison of such a selection criterion 15 with the sequence identifier 10a-i of the sequences 4a-d of the sequence inventory 9 corresponds to a filtering according to those sequences 4a-d that relate precisely to the working devices 6a-f of the respective working machine 2a, b. This can be meaningful because, for example, different sequences 4a-d are of interest for a combine harvester than for a forage harvester.

One possible meaningful reaction by the server 1 to the receipt of a selection criterion 15 from the client 13a-d is to not only transfer an individual sequence 4a to the client 13a-d via the data channel 14 with all associated data, but also to provide the client 132a-d with a menu 19 in advance, i.e., a series of sequences 4a-d from which a single sequence 4a-d can be selected. To this end, the server 1 can be designed to determine a menu 19 of sequences 4a-d from the sequence inventory 9 on the basis of a comparison of the received selection criterion 15 with sequence identifiers 10i-l of the sequences 4a-d of the sequence inventory 9, to generate an overview of this menu 19, and to transfer the overview to the client 13a-d via the data channel 14. Such an overview comprises basically any sub-quantity of information from the sequences 4a-d of the menu 19.

Advantageously, the result is a compact summary of the essential characteristics of the sequences 4a-d of the menu 19, which then makes it possible for the client 13a-d to assess the sequences 4a-d of the menu 19. The overview also can comprise those data of the sequences 4a-d that were specified by the selection criterion 15 that was received and are therefore of particular interest. The particular circumstances are thereby accounted for, namely whether a particular result metric 17a-c, for example, or a certain basic condition, such as a particularly dry or wet field is of decisive importance for the client 13a-d.

The determination of the menu 19 of sequences 4a-d can be based, advantageously, on a comparison of a type of working device and/or a utilization-environment property in the above-described sense of the received selection criterion 15 and on a comparison of the sequence identifiers 10i-l of the sequences 4a-d of the sequence inventory 9. This comparison can comprise, in particular, the identification of a commonality in the sense of an identity.

Proceeding therefrom, it is preferable for this menu 19 to be sorted according to an order, wherein the order can be based on a further sequence identifier 10a-i. This further sequence identifier 10a-i preferably comprises a result metric 17a-c. In this manner, the client 13a-d can request, via the selection criterion 15, a menu 19 of sequences 4a-d, for example, that are all provided for a certain type of grain and certain field geometry. Given that a menu 19 of sequences 4a-d ranked according to a result metric 17a-c is then provided, the client can quickly determine which sequences 4a-d are particularly promising and, therefore, suitable according to the desired type of result metric 17a-c. The type of result metric 17a-c can differ from client 13a-d to client 13a-d. The completeness of the processing or the speed of the processing or the purity of the result may be of interest.

Figure 5:
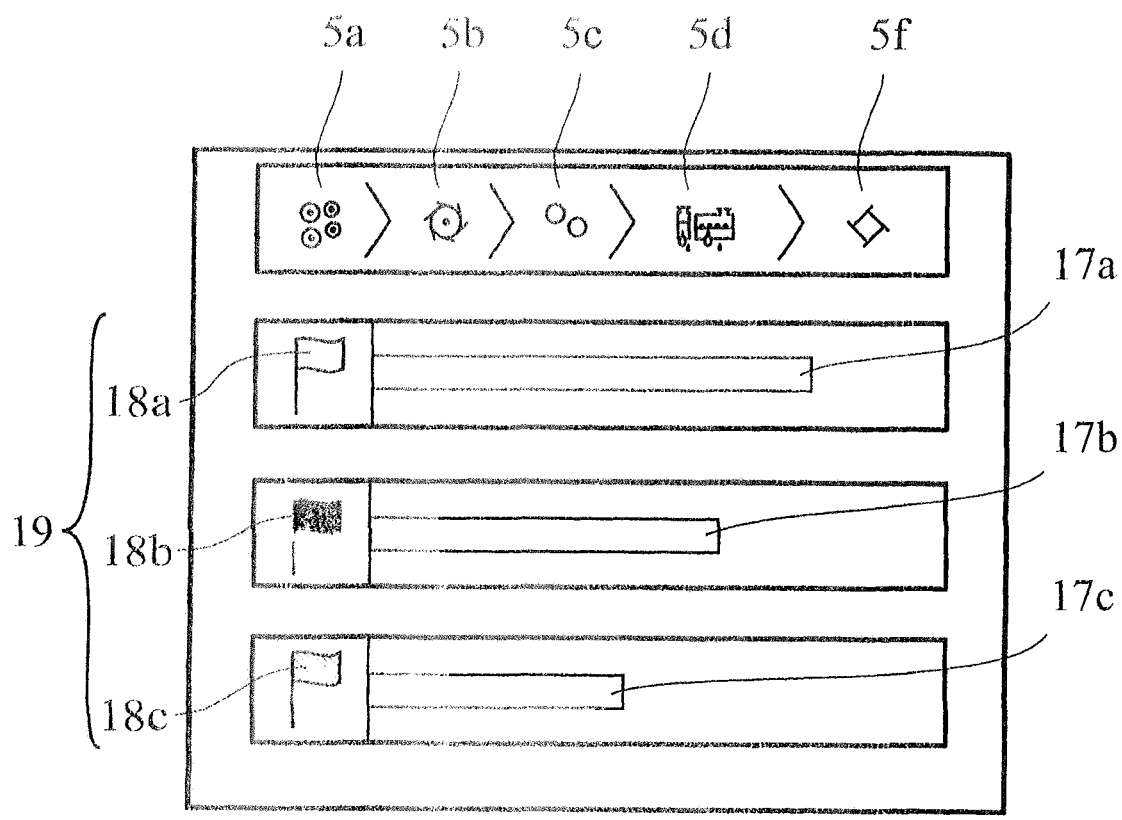
FIG. 5 presents the user interface of the control device displaying a menu of sequences sorted according to the order of a result metric.

FIG. 5 shows one possible representation of such a menu 19 in the case of a client 13a-d. This representation is displayed on a screen of the client 13a-d, for example. The top row shows the sequence 4a having the process steps of intake 5a, chopping 5b, cracking 5c, combining 5d, e, and discharging 5f. These process steps 5a-d, f could have corresponded to the selection criterion 15 of the client 13a-d, for example, in which sequence identifiers 10a-f were specified that characterize precisely these steps by the particular working-device type thereof, and therefore specify a particular functional property.

FIG. 5 shows a menu 19 comprising three entries, i.e., sequences 4a-c, wherein the particular sequence 4a-c itself is not shown, but rather only participant identifiers 18a-c and result metrics 17a-c. Therefore, three sequences 4a-c were determined, each of which is assigned to different participant, and each of which has delivered a different result metric 17a-c. This result metric 17a-c can yield, e.g. a measure of the percentage of completion of the particular sequence 4a-c.

In this menu 19, the uppermost sequence 4a of the participant is shown with the participant identifier 18a having the highest result metric 17a. On the basis thereof, the client 13a-d can now decide to request the sequence 4a, for example, which corresponds to the participant identifier 18a and the result metric 17a in the menu 19 shown, since this is obviously superior to the other sequences 4b-c in terms of the result metric 17a-c of interest.

Reference is now made to the overview in FIG. 1 in order to clearly illustrate the learning effect resulting therefrom. Clearly shown are the agricultural working machines 2a and 2b at use in similar crop fields 20a, b, each of which has a similar headland 21a, b. The agricultural working machine 2b is already further along in processing than the agricultural working machine 2a. The client 13b assigned to the working machine 3b has already implemented a certain sequence 4a and transmitted this sequence 4a to the server 1, which has added this to the sequence inventory 9. Communication with the server 1 took place via a wireless connection 22b to a base station 23b, which communicated with a gateway 24b, which, in turn, is connected to the Internet 12a.

The client 13a of the working machine 2a, in turn, also communicates via a wireless connection 22a to a base station 23a and also has a connection to the Internet 12a via the gateway 24a. As an alternative, the client 13a also can have a different, direct connection to the Internet 12a, which is indicated in FIG. 1 as an example by a satellite 23c. If the client 13a of the working machine 2a then sends a selection criterion 15 to the server 1, which comprises that sequence identifier 10a-i, in fact functional properties in this case, which defines the process steps 5a-f necessary for the field 20a and the headland 21a, then the server 1 also can access the sequence 4a in the sequence inventory 9, which comes from the client 13b of the working machine 2b and is received by the server 1, in order to compile the menu 19. If this sequence 4a proves to be particularly suitable according to a criterion defined by the client 133 of the working machine 2a, which was also transmitted to the server 1 as a sequence identifier 10i of the selection criterion 15, then the client 13a of the working machine 2a can access this sequence 4a, implement this once received by the server 1, and then immediately profit from the good results already obtained by the working machine 2b.

The sequences 4a-d need not necessarily be in a rigid order. Instead, the sequences 4a-d can have a complexity that extends beyond rigid processing according to predetermined parameter sets 7a-f. The sequences 4a-d are preferably formatted according to a sequence syntax, wherein the sequence syntax permits functional dependencies between parameterized process steps 6a-f and/or control structures 25 within the respective sequence 4a-d. The server 1 is designed to modify a sequence 4a-d of the sequence inventory 9 on the basis of the sequence identifier 10a-i assigned to the sequence 4a-d and/or to insert a functional dependency between the parameters 6a-f of parameterized process steps 5a-f of the sequence 4a-d and/or to insert a control structure 25 within the sequence 4a-d.

A functional dependency between parameterized process steps 5a-f is intended to mean that the parameter set 7a-f of a subsequent process step 5a-f, for example, is dependent on the parameter set 7a-f of a previous process step 5a-f. This also can be a measured value determined during the implementation of the preceding process step 5a-f. For example, a subsequent process step 5a-f can provide a parameter set 7a-f that is different, at least in terms of one parameter, depending on the wetness of a field that was determined in a preceding process step 5a-f. Another dependency can be, for example, the weight of a certain amount of crop determined in a preceding process step 5a-f. It is thereby possible to account for a certain variability within a single sequence 4a-d.

A control structure 25 in the present sense is, for example, a branching similar to an if statement, i.e., a conditional instruction, of a programming language, as depicted in FIG. 2. It is clear that a control structure 25 foresees either process step 5d or process step 5e after the process step 5c. The result of this query, in turn, can be dependent on a measurement value determined in one of the preceding process steps 5a-c. As shown in the representation in FIG. 2, after the process step 5d or the process step 5e, the next step in each case is process step 5f.

The server 1 can be provided with a certain logic, which determines dependencies of this type from a plurality of sequences 4a-d of the sequence inventory 9 and uses these to provide the above-described functional interdependencies or control structures 25 in sequences 4a-d. Therefore, this is a further learning effect of the system, which is implemented here by the server 1. The sequence identifiers 10a-i, on which the modification or the insertion of the functional dependence or the control structure 25 is based, are preferably the result metrics 17a-c.

As described above, the sequence inventory 9 of the server 1 is continuously added to and improved in the manners described. In addition to the aforementioned downloading of sequences 4a-d by the client 13a-d, in which the client 13a-d establishes a connection 14 to the server 1 and requests sequences 4a-d according to the selection criterion 15, the server 1 also can proactively inform a known client 13a-d of sequences 4a-d that may be of interest. The server 1 is therefore designed to add a client entry 25a, b in the database 8, wherein this client entry 25a, b comprises a participant identifier 18a-c and a non-illustrated client selection criterion and is designed to transmit notification, on the basis of a comparison of the client selection criterion with sequence identifiers 10a-i of the sequences 4a-d of the sequence inventory 9, to a client 13a-d assigned to the participant identifier 18a-c via the network interface 11. To ensure clarity, the client entries 25a, b are shown outside the data base 8 in FIG. 3.

This client selection criterion can be a selection criterion 15 received from the client 13a-d by the server 1 and, particularly in this case, the most recently received selection criterion 15 or a selection criterion 15 characterized as the client selection criterion. Therefore, this is a selection criterion 15, in the case of which the client 13a-d desires continuous instruction. The comparison of the client selection criterion with the sequence identifier 10a-i can comprise, in particular, the comparison with the sequence identifier 10a-i of newly added or modified sequences 4a-d of the sequence inventory 9. Therefore, those sequences 4a-d of the sequence inventory 9 are investigated in particular that were not yet present in the data base 8 in this form at a previous point in time.

Furthermore, a preferably authorized access time status 26a, b is preferably assigned to each participant identifier 18a, b of the client entries 25a, b, and the selection criterion 15 that is received comprises a participant identifier 18a, b, and the server 1 is designed to either transmit the notification and/or determine the menu 19. The server preferably also is designed to sort the menu 19, and/or transmit the course data that were determined, and/or transmit the determined sequence 4a-d, and/or add a user-defined sequence 4a-d, also on the basis of the authorization status 26a, b that is assigned to the participant identifier 18a, b of the selection criterion 15 that was received.

In other words, all the above-described functionalities according to the invention, or preferred functionalities that the server 1 offers to the client 13a-d are not implemented identically in every case for all clients 13a-d, but rather an investigation is carried out depending on the authorization and, therefore, the access. This investigation can take place in any manner with consideration for the authorization status 26a, b that yields a different result depending on which authorization status 26a, b is assigned to the participant identifier 18a-c of the client 13a-d. The time-specific nature of the authorization status 26a, b means, in the present sense, that such an authorization status can be changed automatically, i.e., induced by the server 1 as well, after a predetermined time.

According to an embodiment, the assigned authorization status 26a, b can be full authorization 27, an authorized access time or non-authorization 28, and the server 1 is designed to block the above-described functions to be carried out according to the authorization status 26a, b in the case of non-authorization 28. This means that these functions are basically unavailable in the case of a non-authorization 28.

Furthermore, the server 1 is preferably designed to change an authorized access time into a non-authorization 28 after expiration of a predetermined authorization time and is designed to change a non-authorization 28 or an authorized access time into a full authorization 27 upon receipt of a full-authorization notification assigned to one of the participant identifiers 18a-c, to which the non-authorization 28 or the authorized access time is assigned.

It also is possible to initially assign a partial authorization to any client 13a-d, which may provide limited functionality of the server 1, and, after expiration of a freely selectable authorization time, to convert said partial authorization into a non-authorization 28, in which this functionality is no longer available, but, if the full-authorization notification is received, to provide the possible transition to full authorization 27 both before and after expiration of the authorization time. This message can be any message that is conveniently directed to the server 1 in a detectably authorized manner and confirms that full authorization 27 is permitted.

The consideration for the authorization status is briefly outlined in FIG. 3, wherein the selection criterion 15 comprises the sequence identifier 10i and the participant identifier 18a. The client entry 25a now shows that full authorization 27 has been assigned to the participant identifier 18a. As a result, the server 1 determines the sequence 4a from the sequence inventory 9 and transmits this sequence 4a to the client 13a via the data channel 14. Another client entry 25b in a client 13b assigns the authorization status 26b of non-authorization 28 to another participant identifier 18b. Upon receipt of a selection criterion 15 having this participant identifier 18b, the transmission of the sequence 4a to the client 13b would therefore have been blocked.

Possible embodiments of a client 13a-d, with which a data channel 14 to the server 1 can be established and with which the above-described functionalities can be implemented, basically comprise all electronic devices that can be used in a network and, in particular, that can access the Internet. A stationary computer referred to as a farm personal computer 16a was already described in the context as a client 13c, although mobile telephones, smart phones, notebooks in general and tablet PCs in particular, and all other comparable devices also are intended here. As a representative thereof, a mobile end device 16b is depicted in FIG. 1, as a further client 13d, which is also connected to the Internet 12a via the base station 23b in this case, as an example.

The data transmitted from the server 1 and, in particular, the sequences, can be depicted in a conventional browser if they are formatted according to the HyperText Markup Language (HTML). In order to depict and process the data transmitted from the server 1, or, optionally to transfer these processed or self-generated data back to the server 1, special software is provided on the client 13a-d, which also is referred to as a sequence administration program. Such a sequence administration program can be an app, which can therefore be obtained from a pertinent Internet site.

It is thereby possible to access the sequence inventory 9 of the server 1 even when there is no intention of implementing a sequence 4a-d immediately, or when this is not possible, since an above-described mobile device 16b will usually not have an interface to working devices 6a-f of an agricultural working machine 2a, b. Nevertheless, such access can make sense when a single contractor would like to control sequences 4a-d or course data of his employees or an agricultural working machine 2a, b. Yields in the form of tonnage per hour or other productivity features, in particular, can be determined and compared in this manner.

It also is possible to transmit sequences 4a-d downloaded from such a mobile end device 16b via a suitable interface to the agricultural working machine 2a, b for implementation. As an alternative, an adapter can be used in order to directly control of the working devices 6a-f of the agricultural working machine 2a, b.

A subject matter, according to the invention, of a client relative to the server 1 is, in particular, a control device for processing sequences 4a-d for agricultural working machines 2a, b, 3a, b, wherein the sequences 4a-d each comprise a sequence of parameterized process steps 5a-f of working devices 6a-f of an agricultural working machine 2a, b, 3a, b. Such a control device according to the invention comprises a client 13a, b having a machine interface 29 for controlling the working devices 6a-f for implementing the process steps 5a-f and a network interface 30 to a global communication network 12, 12a, wherein the network interface 30 is designed to establish a preferably connection-oriented, bidirectional data channel 14 between the client 13a, b and a server 1. According to the invention, the client 13a, b furthermore comprises a user interface 31 for displaying and processing process steps 5a-f and sequences 4a-d, wherein the client 13a, b is designed to transmit a selection criterion 15 to the server 1 via the data channel 14, receive a sequence 4a-d from the server 1 via the data channel 14 and implement the received sequence 4a-d by use of the machine interface 29.

The client 13a, b is therefore provided on the agricultural working machine 2a, b, 3a, b, wherein the client 13a, b can be an electronic device, for example, which is either permanently installed in the agricultural working machine 2a, b, 3a, b or is suitably connected thereto in a data-related manner. The machine interface 29 therefore makes it possible for the client 13a, b to act on the working devices 6a-f of the agricultural working machine 2a, b, 3a, b in a control-related manner. In other words, the client 13a-b can perform this control directly itself and is not dependent on an operator receiving instructions, which are output by the client 13a-b on the user interface 31 graphically or in any other manner, and implementing these instructions manually. The network interface 30 can be any interface, preferably a wireless interface, which permits communication with the global communication network 12, 12. The inter-relationships just described are also depicted in FIG. 3, wherein a specific connection between the machine interface 29 and the working devices 6a-f was omitted in order to ensure clarity.

A client 13a-d in the present sense, similar to the server 1, also can comprise a plurality of interacting electronic devices, which then, in all, for the client 13a-d in the present sense. Furthermore, a procedure to be implemented by the client 13a-d can definitely be initiated by an operator, via the aforementioned user interface 31, for example. It also is possible for the procedures by the client 13a-d to take place automatically, i.e., without being initiated externally. For example, the transmission of the selection criterion 15 to the server 1 via the data channel 14, with subsequent receipt of a sequence 4a-d by the server 1 via the data channel 14 could take place automatically in a predetermined time interval. In this manner, the client 13a-d could therefore automatically ask the server 1 whether new sequences 4a-d corresponding to the selection criterion 15 are present in the server inventory 9 of the server 1. This automation also can relate to the further procedures in the client 13a-d described herein.

The client 13a-b is preferably designed to store sequences 4a-d and implemented process steps 5a-f in a non-illustrated client memory. In this context, the user interface 31 is preferably designed to display stored sequences 4a-d and stored process steps 5a-f and, based on input by the operator, to generate an operator sequence from the stored sequences 4a-d and the stored process steps 5a-f, wherein the client 13a-b is furthermore designed to transmit the operator sequence to the server 1 via the data channel 14.

FIG. 4 shows the representation, by the user interface 31, of an operator sequence, which corresponds to the sequence 4a having the above-described process steps 5a-f. Also shown is the parameter set 7b of the second process step 5b, which is chopping. The operator of the client 13a, b can now process this sequence 4a in entirety or, in particular, the process steps 5a-f of the sequence 4a, and, in this manner or by a new combination of stored process steps 5a-f, generate a new sequence, which is referred to here as an operator sequence. These can then be transmitted to the server 1 and are therefore available to other clients 13a-c by the server 1, as are the other sequences 4a-d of the sequence inventory 9, as described above. The client 13a, b assigns sequence identifiers 10a-i to the operator sequence in particular, wherein the operator sequence having the sequence identifier 10a-i is then transmitted to the server 1 via the data channel 14. The sequence identifiers 10a-i can result automatically, for example, from the individual process steps 5a-f of the sequence 4a or the parameter sets 7a-f thereof, in particular when this is a functional property such as the working-device type for a certain process step 5a-f. These also can be defined by the operator, however, or result from the identity of, the operator, whereby a participant identifier 18a-c is intended to mean a sequence identifier 10a-i of this operator sequence.

According to a development of the control device according to the invention, a self-learning client 13a, b also can be provided, which is characterized in that this is designed to generate a proposed sequence on the basis of implemented process steps 5a-f and implemented sequences 4a-d. A logic can therefore be provided in the client, which analyzes implemented sequences 4a-d and, from these, generates proposed sequences according to pattern recognition. A sequence identifier 10a-i is preferably assigned to these proposed sequences, and the proposed sequence is transmitted, with the sequence identifier 10a-i, to the server 1 via the data channel 14. The statements made with respect to the sequence identifiers 10a-i of the operator sequence apply with respect to the sequence identifier 10a-i of the proposed sequence.

The proposed sequence can be based, preferably, on repeatedly implemented process steps 5a-f and, in this case in particular, on repeatedly implemented process steps 5a-f having identical parameter sets 7a-f. In other words, a proposed sequence is created when it is determined that a fixed sequence of process steps 5a-f, which may even be identical, is carried out.

Finally, according to a control device according to the invention, the selection criterion 15 comprises a participant identifier 18a-c and the client 13a,b comprises a receiving interface, which can be identical to the network interface 30, and the client 13a, b is designed to receive, via the receiving interface, a notification from the server 1 and, based on the notification that is received, to establish the data channel 14 to the server 1 and receive a control sequence 4a-d, which is assigned to the notification, from the server 1 via the data channel 14. In this manner, the client 13a, b has the opportunity to respond to the notifications sent by the server 1.

Further preferred embodiments become apparent from the preferred embodiments of the server system according to the invention.

The invention furthermore relates to a method for the administration of sequences for agricultural working machines in a server, wherein the sequences each comprise a sequence of parameterized process steps of working devices of an agricultural working machine, having the steps of: receiving a connection request from a client via a global communication network, establishing a preferably connection-oriented, bidirectional data channel between the server and the client via the global communication network, receiving a selection criterion from the client via the data channel, determining a sequence from a sequence inventory of a data base of the server on the basis of a comparison of the selection criterion with the sequence identifier of the sequences of the sequence inventory and transmitting the determined sequence to the client via the data channel.

The invention furthermore relates to a method for providing sequences for an agricultural working machine in a client, wherein the sequences each comprise a sequence of parameterized process steps of working devices of an agricultural working machine, having the steps of: establishing a preferably connection-oriented, bidirectional data channel between the server and the client via a global communication network, transmitting a selection criterion to the server via the data channel, receiving a sequence from the server via the data channel, implementing the received sequence by a machine interface in order to control the working devices.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A server system for the administration of sequences for agricultural working machines, which sequences each comprise parameterized process steps of working devices of the agricultural working machines, comprising:

a server having a data base in which a sequence inventory of sequences is stored, wherein sequence identifiers are assigned to each of the sequences that describe one or more of the parameterized process steps of the respective sequence; and a network interface to a global communication network receives connection requests from a client control devices provided on one of the agricultural working machines and establishes a connection-oriented, bidirectional data channel between the server and the client control devices;

wherein the server receives a selection criterion from the client control device on the one agricultural working machine via the data channel and determines a sequence of parameterized process steps of working devices of the one agricultural working machine from the sequence inventory based on a comparison of the selection criterion with the sequence identifiers of the sequence and transmits the determined sequence to the client control device via the data channel; and wherein the client control device implements the sequence of the parameterized process steps received via the data channel to control the working devices of the one agricultural working machine.

2. The server system according to claim 1, wherein the sequence identifiers comprise one or more of the group consisting of a functional property such as working-device type or a working-device identification, a parameter setting of a working device, a sensor setting, a utilization-environment property such as sensor data, a working result such as a result metric, a participant identifier such as a personal identification, a client identification.

3. The server system according to claim 1, wherein the server receives an operator-generated sequence to which a sequence identifier is assigned from a client via the data channel and add the sequence to the sequence inventory.

4. The server system according to claim 1, wherein a course inventory of agricultural course data comprising a utilization-environment property, a work result or both, is stored in the data base, wherein a course identifier is respectively assigned to the course data such as a sequence of the sequence inventory and wherein the server receives a course criterion such as a participant identifier from the client via the data channel, determines course data from the course inventory on the basis of a comparison of the course criterion with the course identifier of the course inventory and transmits the determined course data to the client via the data channel.

5. The server system according to claim 1, wherein the selection criterion comprises one or more of the group consisting of a sequence identifier comprising functional property in the form of a working-device type or working-device identification, a parameter setting of a working device, a sensor setting, a utilization-environment property such as sensor data, a working result such as a result metric, a participant identifier such as a personal identification and a client identification.

6. The server system according to claim 5, wherein the server is designed to determine a menu of sequences from the sequence inventory on the basis of a comparison of the received selection criterion with sequence identifiers of the sequences of the sequence inventory on the basis of any of the group consisting of a comparison such as a commonality, a working-device type and a utilization-environment property, generate an overview of the menu and transmit the overview to the client via the data channel.

7. The server system according to claim 6, wherein the menu is sorted according to an order, wherein the order is based on a further sequence identifier such as a result metric and wherein the further sequence identifier is included in the selection criterion.

8. The server system according to claim 1, wherein the sequences are formatted according to a sequence syntax, wherein the sequence syntax permits functional dependencies between parameterized process steps, control structures within the respective sequence or both and wherein the server is designed to modify a sequence of the sequence inventory on the basis of the sequence identifiers assigned to the sequence such as on the basis of the result metrics, and on the basis of the course data assigned to the sequence, to modify a parameter set of a parameterized process step, to add a functional dependency between the parameter sets of parameterized process steps of the sequence or to add a control structure within the sequence.

9. The server system according to claim 1, wherein the server is designed to add a client entry in the data base, wherein this client entry comprises a participant identifier and a client selection criterion and is designed to transmit a notification to a client, which is assigned to the participant identifier via the network interface on the basis of a comparison of the client selection criterion with sequence identifiers of the sequences of the sequence inventory on the basis of a comparison of the client selection criteria with sequence identifiers of newly added or modified sequences of the sequence inventory.

10. The server system according to claim 9, wherein an authorized access time status is assigned to each participant identifier of the client entries and the selection criterion that is received comprises a participant identifier and wherein the server is designed to perform any of the group consisting of transmit the notification, determine the menu, sort the menu, transmit the course data that were determined, transmit the determined sequence, and add a user-defined sequence, also on the basis of the authorization status that is assigned to the participant identifier of the selection criterion that was received.

11. The server system according to claim 10, wherein the assigned authorization status can be full authorization, an authorized access time, or non-authorization (28) and wherein the server is designed to perform any of the group consisting of transmit the notification, determine the menu, sort the menu, transmit the determined course data, transmit the determined sequence, block the addition of a user-generated sequence in the event of non-authorization, change an authorized access time into non-authorization after expiration of a predetermined authorization time and change non-authorization or an authorized access time into full authorization upon receipt of a full-authorization notification assigned to the participant identifier to which the non-authorization or the authorized access time is assigned.

12. A control device for processing sequences for agricultural working machines, wherein the sequences each comprise a sequence of parameterized process steps of working devices of an agricultural working machine, wherein the control device comprises a client having a machine interface for controlling the working devices for implementing the process steps, a network interface to a global communication network, wherein the network interface is designed to establish a connection-oriented, bidirectional data channel between the client and a server, and a user interface for displaying and processing process steps and sequences, wherein the client is designed to transmit a selection criterion to the server via the data channel, receive a sequence from the server via the data channel and implement the received sequence by the machine interface.

13. The control device according to claim 12, wherein the client is designed to store sequences and implemented process steps in a client memory, and the user interface is designed to display stored sequences and stored process steps and, on the basis of input by the operator, to generate an operator sequence from the stored sequences and the stored process steps, wherein the client is furthermore designed to transmit the operator sequence to the server via the data channel to assign a sequence identifier to the operator sequence, and transmit the operator sequence, with the sequence identifier to the server via the data channel.

14. The control device according to claim 12, wherein the client is designed to generate a proposed sequence on the basis of implemented process steps and on the basis of implemented sequences such as repeatedly implemented process steps having identical parameter sets, to assign a sequence identifier to the proposed sequence and transmit the proposed sequence with the sequence identifier to the server via the data channel.

15. The control device according to claim 12, wherein the selection criterion comprises a participant identifier and the client has a receiving interface and is designed to receive, via the receiving interface, a notification from the server and, based on the notification that is received, to establish the data channel to the server and receive a control sequence, which is assigned to the notification, from the server via the data channel.

* * * * *